(12) United States Patent
Tang et al.

(10) Patent No.: US 9,515,541 B2
(45) Date of Patent: Dec. 6, 2016

(54) AUDIO RESONANCE VIBRATOR

(71) Applicants: Yun Tang, Shenzhen (CN); Guanrong Zhou, Shenzhen (CN)

(72) Inventors: Yun Tang, Shenzhen (CN); Guanrong Zhou, Shenzhen (CN)

(73) Assignee: AAC Acoustic Technologies (Shenzhen) Co., Ltd., Shenzhen (CN)

( * ) Notice: Subject to any disclaimer, the term of this patent is extended or adjusted under 35 U.S.C. 154(b) by 400 days.

(21) Appl. No.: 13/971,947

(22) Filed: Aug. 21, 2013

(65) Prior Publication Data
US 2014/0054984 A1 Feb. 27, 2014

(30) Foreign Application Priority Data

Aug. 21, 2012 (CN) .................... 2012 2 0415734 U

(51) Int. Cl.
*H02K 33/18* (2006.01)
*H04R 9/06* (2006.01)
*H04R 9/04* (2006.01)
*H02K 33/00* (2006.01)

(52) U.S. Cl.
CPC .............. *H02K 33/18* (2013.01); *H04R 9/046* (2013.01); *H02K 33/00* (2013.01); *H04R 9/06* (2013.01); *H04R 9/066* (2013.01); *H04R 2400/11* (2013.01); *H04R 2499/11* (2013.01)

(58) Field of Classification Search
CPC .... H02K 33/18; H02K 41/0354; H02K 33/00; H04R 9/046; H04R 2499/11; H04R 2400/11; H04R 9/066; H04R 9/06
USPC ......................................... 310/12.16, 28, 15
See application file for complete search history.

(56) References Cited

U.S. PATENT DOCUMENTS

| 4,506,117 A * | 3/1985 | Fresard ................. H04R 9/066 181/150 |
| 2009/0184589 A1* | 7/2009 | Yamagishi ............. H04R 9/066 310/12.16 |
| 2013/0156237 A1* | 6/2013 | Kim ........................ H01R 9/06 381/191 |

* cited by examiner

*Primary Examiner* — Joshua Benitez-Rosario
*Assistant Examiner* — Alexander Moraza
(74) *Attorney, Agent, or Firm* — Na Xu; IPro, PLLC

(57) ABSTRACT

An audio resonance vibrator includes a bracket, an elastic frame cooperatively with the bracket forming a housing having a receiving space, a magnetic circuit unit and a vibrating unit accommodated in the receiving space. The vibrating unit includes a vibrating plate and a coil assembly. The elastic frame further includes a bottom, a side wall extending vertically from the bottom, a supporting portion extending inwardly from the sidewall along a direction parallel to the bottom wall of the elastic frame, a slot formed between the bottom of the elastic frame for receiving the vibrating plate.

2 Claims, 1 Drawing Sheet

AUDIO RESONANCE VIBRATOR

FIELD OF THE INVENTION

The present invention generally relates to the art of acoustic resonance devices, and more particularly to an audio resonance vibrator provided with a resonance medium for generating sound.

DESCRIPTION OF RELATED ARTS

With the rapid development of the portable devices such as cellular phones and notebook computers, people request for more and more functions. All kinds of electronic devices constantly bring to people's lives in many convenience and fun. Among them, a lot of electronic devices are equipped with speaker body. Institutions can broadcast through a speaker sound signal, to play music, messages or oral communication and other activities.

Generally, a conventional speaker comprises a case, a magnetic circuit part received in the case, and a vibrating membrane assembled with a coil. When the coil is electrified by alternating current, the magnetic circuit part and the coil generates an alternating magnetic field. By the interaction between the alternating magnetic field and the alternating current in the coil, the vibrating member is activated to move along a vibration direction for generating sound.

However, as the vibrating membrane is weak and is easy to be damaged, the life circle of the speaker is short. And, the vibrating membrane is generally a thin film which badly affects the low frequency sound quality produced by the membrane.

In the field of music enjoying of the notebook computers, a multifunction vibrator enabling providing both audible and tactile sensations for amusement has already been widely used. The multifunction vibrator is connected with a resonance medium which drives a vibrating member to vibrate to produce resonance with the resonance medium to produce a sound. Even if the vibrator is coupled with the resonance medium, the contacting relationship therebetween is not stable. Further, during the vibration of the vibrator, the resonance medium may be damaged by the vibrator. The vibrator as configured above cannot work as desired.

Therefore, an improved vibrator is provided in the present disclosure to solve the problems mentioned above.

DETAILED DESCRIPTION OF THE EXEMPLARY EMBODIMENT

Reference will now be made to describe the exemplary embodiment of the present invention in detail.

Figure 1:
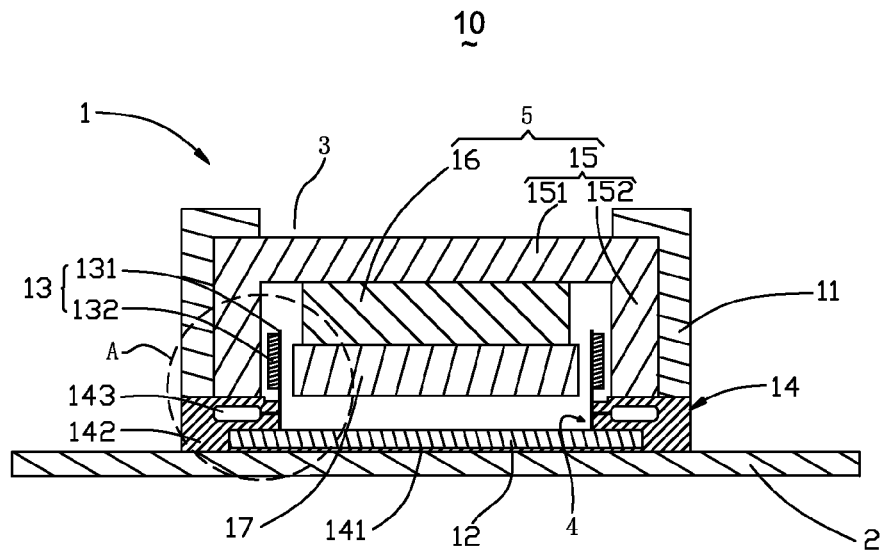
FIG. 1 is a cross-sectional view of an audio resonance vibrator in accordance with an exemplary embodiment of the present invention.
Figure 2:
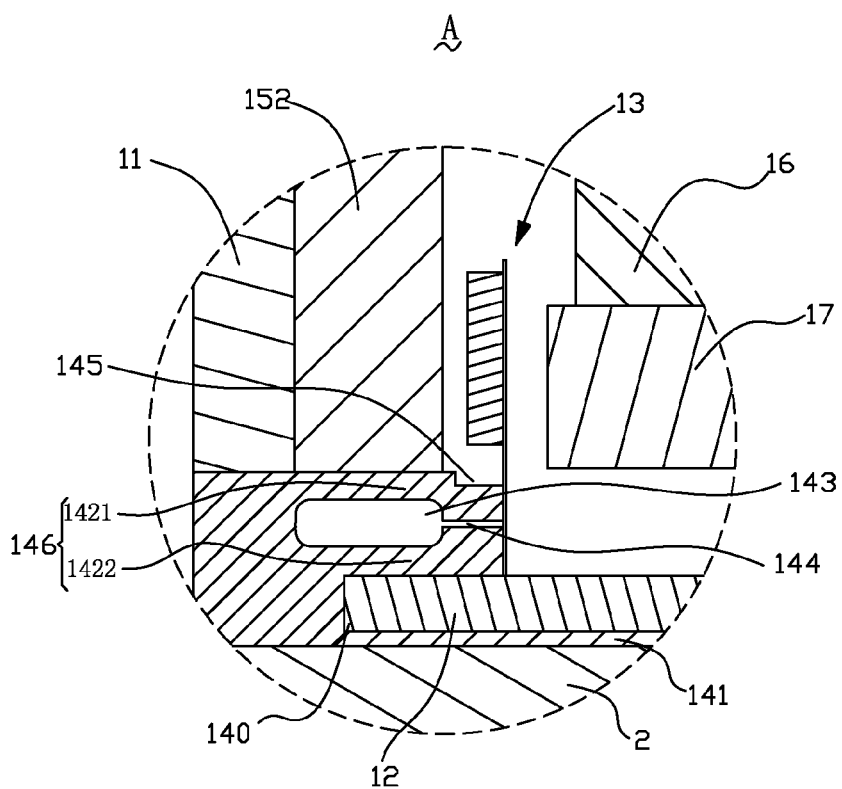
FIG. 2 is an enlarged view of part A in FIG. 1.

Referring to FIGS. 1 through 2, the exemplary embodiment of the present invention discloses an audio system 10 including a resonant medium 2, an audio resonance vibrator 1 disposed on the resonant medium 2. The audio resonance vibrator 1 is capable of driving the resonant medium 2 to vibrate in a proper frequency range so as to generate sound. For enhancing the low frequency sound quality, the resonant medium is made from rigid material, such as a metal plate, glass, or wood. It is also can be made from semi-rigid cardboard, plastic plate. In the present embodiment, the resonant medium 2 may be a part of an outer case of a notebook computer or a part of a table, and so on.

The audio resonance vibrator 1 has an elastic frame 14 disposed on the surface of the resonant medium 2 and a bracket 11 supported by the elastic frame 14 corporately forming a housing having a receiving space 3. The housing accommodates a magnetic circuit unit 5 and a vibrating unit 4 therein. The magnetic circuit unit 5 includes a yoke 15 having a bottom 151 and a sidewall 152 extending vertically from the bottom 151, a magnet 16 mounted on the bottom 151, and a pole plate 17 mounted on the magnet 16. The yoke 15 is configured to be like a bowl and has a hollow space for accommodating the magnet 16 and pole plate 17. The magnet 16 is positioned on a central part of the bottom 151 of the yoke 15. A magnetic gap is formed by an outer surface of the magnet 16 and an inner surface of the yoke 15. The vibrating unit 4 includes a vibrating plate 12 partially embedded in the elastic frame 14 and a coil assembly 13 connected directly or indirectly with the vibrating plate 12. In the embodiment, the coil assembly 13 further includes a coil 132 and a frame 131 wrapped by the coil 132. The coil 131 is partially received in the magnetic gap. When electrified, the coil assembly 13 vibrates along a direction upright to the vibrating plate 12 so as to force the vibrating plate 12 to vibrate.

Furthermore, the elastic frame 14 is a damper configured for restricting steady-state vibration amplitude at resonance. It is optional that the elastic frame may be made from plastic or rubber, such as silica gel. The elastic frame 14 has a bottom wall 141 and a sidewall 142 extending vertically from the bottom wall 141. The vibrating plate 141 is attached to the bottom of the elastic frame 14. The elastic frame 14 has a supporting portion 146 extending perpendicularly from the sidewall 142 along a direction parallel to the bottom wall 141 of the elastic frame 14 to support the coil assembly 13. Alternatively, the vibrating plate may also be sandwiched between the supporting portion 146 and bottom wall 141.

In the exemplary embodiment, the supporting portion 146 further defines a first supporting portion 1421 and a second supporting portion 1422 extending inwardly from the sidewall 142 along a direction parallel to the bottom wall 141 of the elastic frame 14, respectively. The first supporting portion 1421 is arranged above the second supporting portion 1422. The ends of the first supporting portion 1421 and the second supporting portion 1422 are attached to the frame 131 of the coil assembly 13 for supporting the coil assembly 13. A first gap 143 and a second gap 144 are formed by the first supporting portion 1421 cooperatively with the second supporting portion 1422, for making the sidewall 142 of the elastic frame 14 produce distortion easily, further depressing harmonic frequency of the audio resonance vibrator 1 for obtaining more better low frequency sound quality. The first gap 143 is farther away from the frame 131 of the coil assembly 13 than the second gap 144. In other words, the second gap 144 is formed between the end of the first supporting portion and the end of the second supporting portion 1422. In addition, the volume of the first gap 143 is greater than the volume of the second gap 144.

In the present embodiment, a slot 140 is formed between the bottom 141 of the elastic frame 14 and the second supporting portion 1422 for receiving the vibrating plate 12. In other words, the edge of the vibrating plate 12 is at least partially sandwiched between the bottom 141 of the elastic frame 14 and the second supporting portion 1422. Thereby, the vibrating plate 12 is assembled with the bottom wall 141 of the elastic frame 14 by injection molding or other assembling method.

Optionally, the first supporting portion 1421 further includes a groove 145 arranged on the end of the first portion 1421 corresponding to the coil 132 for avoiding the bumping between the coil 132 and the first supporting portion 1421.

In this embodiment, the side wall 152 of the yoke 15 is surrounded by the bracket 11. The combination of the yoke and the bracket is arranged on the elastic frame 14. Specifically, the sidewall of the bracket 11 is positioned on the side wall sidewall 142 of the elastic frame 14, and the sidewall 152 of the yoke is positioned on the first supporting portion 1421.

When contacting the resonant medium 2, the audio resonance vibrator 1 provides a high-frequency vibration signal to the resonant medium 2 by virtue of the vibration of the vibrating plate 12 thereof, the vibration signal will cause the resonant medium 2 together with the vibrating plate 12 to synchronously vibrate in a frequency range so as to generate sound. Especially, the audio resonance vibrator 1 can generate high quality low frequency sound by virtue of the bottom 141 of the elastic frame 14 serving as a damping plate.

While the present invention has been described with reference to a specific embodiment, the description of the invention is illustrative and is not to be construed as limiting the invention. Various of modifications to the present invention can be made to the exemplary embodiment by those skilled in the art without departing from the true spirit and scope of the invention as defined by the appended claims.

What is claimed is:

1. An audio resonance vibrator, comprising:
   a bracket;
   an elastic frame cooperatively with the bracket forming a housing defining a receiving space;
   a magnetic circuit unit accommodated in the receiving space and including a yoke and a magnet, the yoke mounted on the bracket and further defining a bottom and a sidewall extending from the bottom, the magnet mounted on the bottom of the yoke;
   a vibrating unit accommodated in the receiving space and defining a vibrating plate and a coil assembly connected with the vibrating plate, the coil assembly at least partially suspended in the magnetic circuit unit; wherein
   the elastic frame further defines a bottom wall, a side wall extending vertically from the bottom wall, and a supporting portion extending inwardly from the sidewall along a direction parallel to the bottom wall of the elastic frame, the sidewall of the yoke located on the supporting portion of the elastic frame;
   the vibrating plate is positioned on the bottom wall and is sandwiched between the supporting portion and the bottom wall of the elastic frame; and wherein
   an end of the supporting portion couples to the coil assembly; wherein
   the supporting portion defines a first supporting portion and a second supporting portion opposed to the first supporting portion, and the sidewall of the yoke is located on the first supporting portion; wherein
   a distance from the first supporting portion to the bottom wall of the elastic member is greater than a distance from the second supporting portion to the bottom wall; wherein
   a first gap and a second gap are formed by the first supporting portion cooperatively with the second supporting portion; wherein
   the volume of the first gap is greater than the volume of the second gap; wherein
   a groove is arranged on the end of the first portion corresponding to the coil for avoiding the bumping between the coil assembly and the first supporting portion.

2. An audio resonance vibrator, comprising:
   a bracket;
   an elastic frame cooperatively with the bracket forming a housing defining a receiving space;
   a magnetic circuit unit accommodated in the receiving space and including a yoke and a magnet, the yoke mounted on the bracket and further defining a bottom and a sidewall extending vertically from the bottom, the magnet mounted on the bottom of the yoke;
   a vibrating unit accommodated in the receiving space and defining a vibrating plate and a coil assembly connected with the vibrating plate, the coil assembly at least partially suspended in the magnetic circuit unit;
   the elastic frame further defining a bottom wall, a side wall extending vertically from the bottom wall, and a supporting portion extending inwardly from the sidewall along a direction parallel to the bottom wall of the elastic frame, the sidewall of the yoke located on the supporting portion of the elastic frame;
   a slot formed between the bottom wall of the elastic frame and the supporting portion for receiving the vibrating plate; and wherein
   an end of the supporting portion couples to the coil assembly; wherein
   the supporting portion defines a first supporting portion and a second supporting portion opposed to the first supporting portion, and the sidewall of the yoke is located on the first supporting portion; wherein
   a first gap and a second gap are formed by the first supporting portion cooperatively with the second supporting portion; wherein
   a groove is arranged on the end of the first portion corresponding to the coil for avoiding the bumping between the coil assembly and the first supporting portion.

* * * * *